United States Patent [19]
Alspector et al.

[11] Patent Number: 5,504,780
[45] Date of Patent: Apr. 2, 1996

[54] ADAPTIVE EQUALIZER USING SELF-LEARNING NEURAL NETWORK

[75] Inventors: Joshua Alspector, Westfield; Timothy X. Brown, Mendham; Anthony Jayakumar, Somerset, all of N.J.

[73] Assignee: Bell Communications Research Inc., Livingston, N.J.

[21] Appl. No.: 178,228

[22] Filed: Jan. 6, 1994

[51] Int. Cl.$^6$ .................................................. H03H 7/30
[52] U.S. Cl. ......................... 375/230; 375/229; 375/232; 395/21; 395/23
[58] Field of Search ............................. 375/230, 229; 395/21, 20, 23, 24, 22

[56] References Cited

U.S. PATENT DOCUMENTS

| | | | |
|---|---|---|---|
| 4,874,963 | 10/1989 | Alspector | 307/201 |
| 5,083,285 | 1/1992 | Shima et al. | 395/24 |
| 5,187,680 | 2/1993 | Engeler | 364/807 |
| 5,272,723 | 12/1993 | Kimoto et al. | 375/11 |
| 5,336,937 | 8/1994 | Sridhar et al. | 307/201 |
| 5,361,327 | 11/1994 | Takahashi | 395/22 |
| 5,396,581 | 3/1995 | Mashiko | 395/24 |

OTHER PUBLICATIONS

S. Chen, et al., "Adaptive channel equalisation using a polynomial–perception structure, *IEE Proceedings,*" 1990, vol. 137, pp. 257–264.
W. R. Kirkland et al., "On the Application of Feed Forward Neural Networks to Channel Equalization," *IEEE Proceedings/INNS International Joint Conference on Neural Networks*, 1992, vol. II, pp. 919–924.
J. Y. Lin et al., "A new adaptive equalizer for nonlinear channels," *IEEE Proceedings/INNS International Joint Conference on Neural Network*, 1992, vol. II, pp. 2814–2817.
N. W. K. Lo et al., "Neural Network Channel Equalization," *IEEE Proceedings/INNS International Joint Conference on Neural Network*, 1992, vol. II, pp. 981–986.
S. Quereshi, "Adaptive equalization," *IEEE Communications Magazine*, Mar. 1992, pp. 9–16.
S. H. Bang et al., "Neural Network Communication Receiver Based on the Nonlinear Filtering," *IEEE Proceedings/INNS International Joint Conference on Neural Network*, 1992, vol. II, pp. 999–1004.

*Primary Examiner*—Edward L. Coles, Sr.
*Assistant Examiner*—Madeleine Anh-Vinh Nguyen
*Attorney, Agent, or Firm*—Leonard Charles Suchyta; James W. Falk

[57] ABSTRACT

A channel equalizer is formed using a self-learning neural network. During a training period, the neural network is taught the channel response function. The network is then used to equalize distortions introduced into signals by the channel. The neural network may be a Boltzmann Machine type of neural network comprising neurons arranged in an input layer, a hidden layer, and an output layer. The neurons are interconnected by bidirectional symmetric weighted synapses. Each neuron is preferably implemented by an analog integrated circuit. Direct communication between the input and output layers helps in faster channel acquisition. The scheme can very easily be extended to multilevel and multisymbol modulation schemes such as QAM and PSK.

12 Claims, 6 Drawing Sheets

5,504,780

ADAPTIVE EQUALIZER USING SELF-LEARNING NEURAL NETWORK

RELATED PATENT AND PATENT APPLICATION

U.S. Pat. No. 4,874,963 entitled "Neuromorphic Learning Networks" issued Oct. 17, 1989 to R. B. Allen and J. Alspector and assigned to the assignee hereof contains subject matter related to the subject matter of the present application.

U.S. patent application Ser. No. 178,428, entitled Neuron For Use in Self-Learning Neural Network, filed on even date herewith for Joshua Alspector and Anthony Jayakumar now U.S. Pat. No. 5,412,256, issued May 2, 1995, and assigned to the assignee hereof contains subject matter related to the subject matter of the present application.

The above identified patent and patent application are incorporated herein by reference.

1. Field of the Invention

The present invention relates to an equalizer for equalizing the response of a communications channel. More particularly, the present invention relates to a channel equalizer comprising a self-learning neural network implemented in VLSI.

2. Background of the Invention

The rapidly evolving telecommunications industry is committed to provide ubiquitous and tetherless data and voice communications capability to its customers. The wireless Personal Communication Network (PCN) technology is a key component of this evolution.

In such an environment channel equalization may be quite important. Channel equalization is a signal processing technique by which the dispersive, non-linear, multipath effects of a transmission channel are reduced. This enhances the signal to noise ratio and thereby enhances the quality of a received transmission.

A communication system is illustrated in FIG. 1. The system 10 of the FIG. 1 comprises a transmitter 12, a channel 14, an equalizer 20, and a receiver 22. The transmitter 12 transmits the discrete symbols X(k),k=1,2,3 . . . via the analog channel 14. Illustratively, each symbol X(k) has a value which is zero or one but may have more levels in different modulation schemes. Because of the limited bandwidth and other imperfections of the channel, the symbols X(k) are distorted after getting through the channel. The distorted symbols are further degraded by noise N(k). The symbols, after transmission through the distortion introducing channel 14 and after degradation by the noise, are designated Z(k). A channel equalizer 20 is provided to correct for the distortions introduced by the channel and the noise. Thus, the channel equalizer 20 receives the distorted symbols Z(k) and outputs symbols $\hat{X}(k)$ which approximate as closely as possible the original symbols X(k). The symbols $\hat{X}(k)$ are then received at the receiver 22.

If the channel frequency response H(z) is known, then the frequency response of the equalizer 20 can be set to C(z)= $H^{-1}(z)$. Hence, the distortion of the channel due to limited bandwidth can be eliminated. However, the channel frequency response is generally unknown and varies with time in response to a variety of different conditions such as atmospheric disturbances. In addition, there still remains the issue of filtering the noise. Hence, an adaptive channel equalizer is used to estimate the inverse channel response and to filter the noise.

Conventional approaches to channel equalization rely on fast, power-hungry digital signal processors and other peripheral components such as analog-to-digital converters, digital-to-analog converters and memory devices. These signal processors utilize the Least Mean Squares (LMS) algorithm or a more complex algorithm such as a Kalman filter algorithm. The execution of these algorithms in a signal processor consumes a lot of energy. This is not a problem in wireline immobile technology where local power is available through the telephone wire as in POTS (Plain Old Telephone Service) or a local power outlet as in ISDN (Integrated Services Digital Network). However, in the case of wireless technologies where the typical portable device or handset is powered by compact battery cells, power consumption is an important issue.

Accordingly, it is an object of the present invention to provide a channel equalizer which is less complex and consumes less power than a conventional channel equalizer. More particularly, it is an object of the present invention to provide a channel equalizer in the form of a self-learning neural network such as a Boltzmann Machine implemented in VLSI.

SUMMARY OF THE INVENTION

In accordance with the present invention, the channel equalization problem is treated as a classification problem. For example, the input symbols to the channel X(k) are a sequence of zero's and one's. The output symbols Z(k) take on any of many values such as 0.345, 0.746, etc. Each output symbol may be classified as a zero or a one to reconstruct the original symbol stream.

In accordance with the present invention, this classification is performed using a self-learning neural network such as a Boltzmann Machine type neural network. The Boltzmann Machine type neural network typically comprises an input layer of neurons, an output layer of neurons, and a hidden layer of neurons in between the input layer and output layer. Preferably, the output layer has only one neuron, but more than one in case of multi symbol modulation schemes. The neurons are connected by synapses. A connection pattern is provided so that, for example, each neuron in the input layer is connected to each neuron in the hidden layer and to the single or more neuron(s) in the output layer. In addition, each neuron in the hidden layer is connected to the single or more neuron(s) in the output layer. The direct connection between the input and the output layers helps in the fast acquisition of the channel.

In general, each neuron has one or more inputs in the form of currents. When the sum of the input currents including a threshold is greater than zero, the neurons output is closer to the logic "one" state. When the sum of the input currents including a threshold current is less than zero, the neuron output is closer to the logic "zero" state.

In a Boltzmann Machine type neural network, the synaptic connections between neuron pairs are bidirectional and symmetric. This means that the weight of the synaptic connection between the output of neuron j and an input of neuron i is the same as the weight of the synaptic connection between the output of neuron i and an input of neuron j.

In a Boltzmann Machine type neural network, the synaptic weights are determined using local information generated during a training phase. There is no processor which globally determines the synaptic weights.

Each neuron may be implemented in VLSI as follows. A summation node is provided to sum the input currents using Kirchoff's current summation law. The summed input current is then normalized using a coarse current normalizer. The normalized summed input current is then converted to a voltage by a current-to-voltage converter. The output voltage of the current-to-voltage converter represents the normalized summed input current. The output stage of the neuron is a gain controlled cascode amplifier output stage. This amplifier receives the output of the voltage-to-current converter and generates the output signal of the neuron which can take a range of values between logic "zero" and logic "one". The gain controlled cascode amplifier stage also includes a circuit for injecting noise so the neuron can be settled using simulated annealing. A circuit for varying the gain of the output stage between zero and a maximum is also provided so that the neuron can be settled using the Mean Field Approximation.

The above described self-learning neural network is utilized to implement a channel equalizer according to the invention as follows. The neurons in the input layer of the neural network receive currents representative of the $Z(k)$'s via a tapped delay line. At each cycle, the $Z(k)$'s are shifted one position along the tapped delay line. During each cycle, the output neuron outputs a value closer to a logic zero or a logic one corresponding to an $\hat{X}(k)$.

During training, $Z(k)$'s corresponding to known values of $X(k)$ are applied to the input layer neurons so that the neuron network can learn the channel response function, i.e. the weights of the synaptic connections between the neurons are adjusted to correspond to the response of the channel. The neural network is retrained typically every one hundred to one thousand received symbols in view of the time dependent nature of the channel response.

The inventive channel equalizer consumes one order of magnitude less power than a conventional channel equalizer.

DETAILED DESCRIPTION OF THE INVENTION

Figure 2:
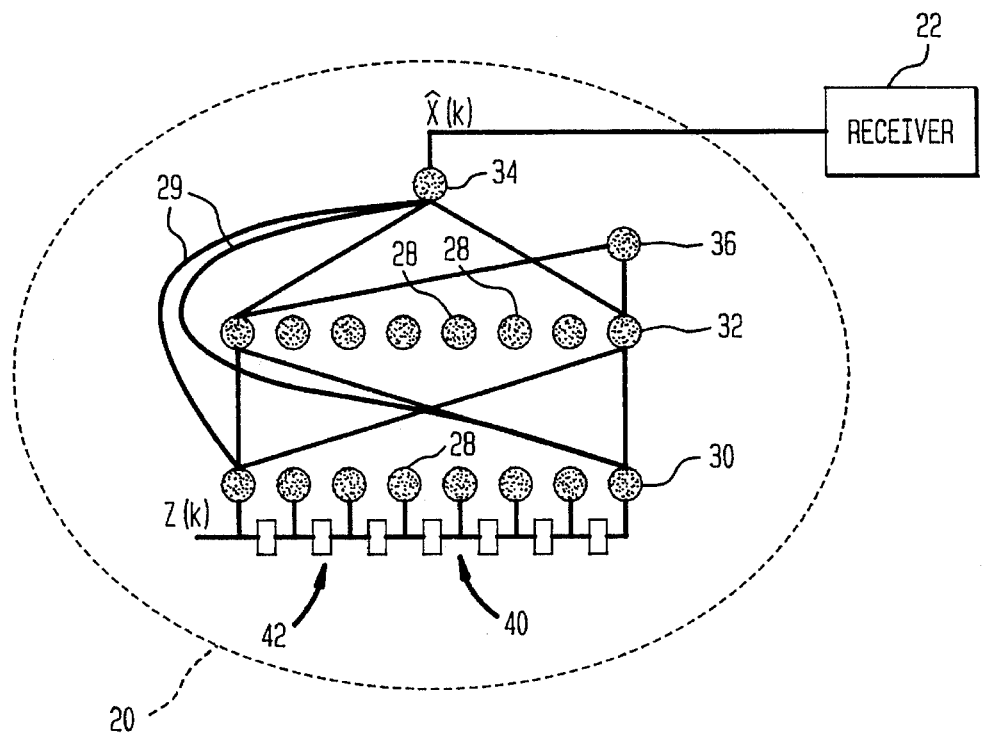
FIG. 2 illustrates a channel equalizer implemented using a Boltzmann Machine type neural network according to the present invention.

FIG. 2 illustrates a channel equalizer in the form of a Boltzmann Machine type neural network according to the invention.

The channel equalizer 20 of FIG. 2 is a neural network which comprises a plurality of neurons 28 connected by synapses 29. The neural network comprises three layers of neurons: an input layer 30, a hidden layer 32, and an output layer 34. A bias neuron 36 is also provided. For purposes of clarity, all of the synapses 29 connecting pairs of neurons are not shown in FIG. 2; rather only a few of the synapses are shown.

The full connection pattern is as follows. There is a symmetric bidirectional synapse between each neuron in the input layer and the single neuron in the output layer. There is a symmetric bidirectional synapse between each neuron in the input layer and each neuron in the hidden layer. There is also a symmetric bidirectional synapse between each neuron in the hidden layer and the single neuron of the output layer. In addition, the bias neuron 36 is connected to all the hidden and output neurons to supply a threshold current for these neurons.

The distorted symbols $Z(k)$ are introduced into a tapped delay line 40. The tapped delay line 40 comprises a plurality of single cycle delays 42. At each cycle, all of the $Z(k)$'s are shifted one position to the right. An input of each neuron in the input layer 30 is connected during each cycle to the tapped delay line and each neuron in the input layer receives a value $Z(k)$ during each cycle. The single neuron in the output layer outputs during each cycle a logic zero or a logic one corresponding to a particular $\hat{X}(k)$. The values $\hat{X}(k)$ are fed to the receiver 22 (see FIG. 1).

The neural network is retrained approximately every one hundred to one thousand cycles because the channel response function is time dependent. During training, known patterns of bits are transmitted via the channel and the synaptic weights are adjusted (in a manner described below) so that the known pattern of bits is generated by the neuron in the output layer. It may require fifty training patterns for the neural network to initially acquire the channel response.

Figure 3:
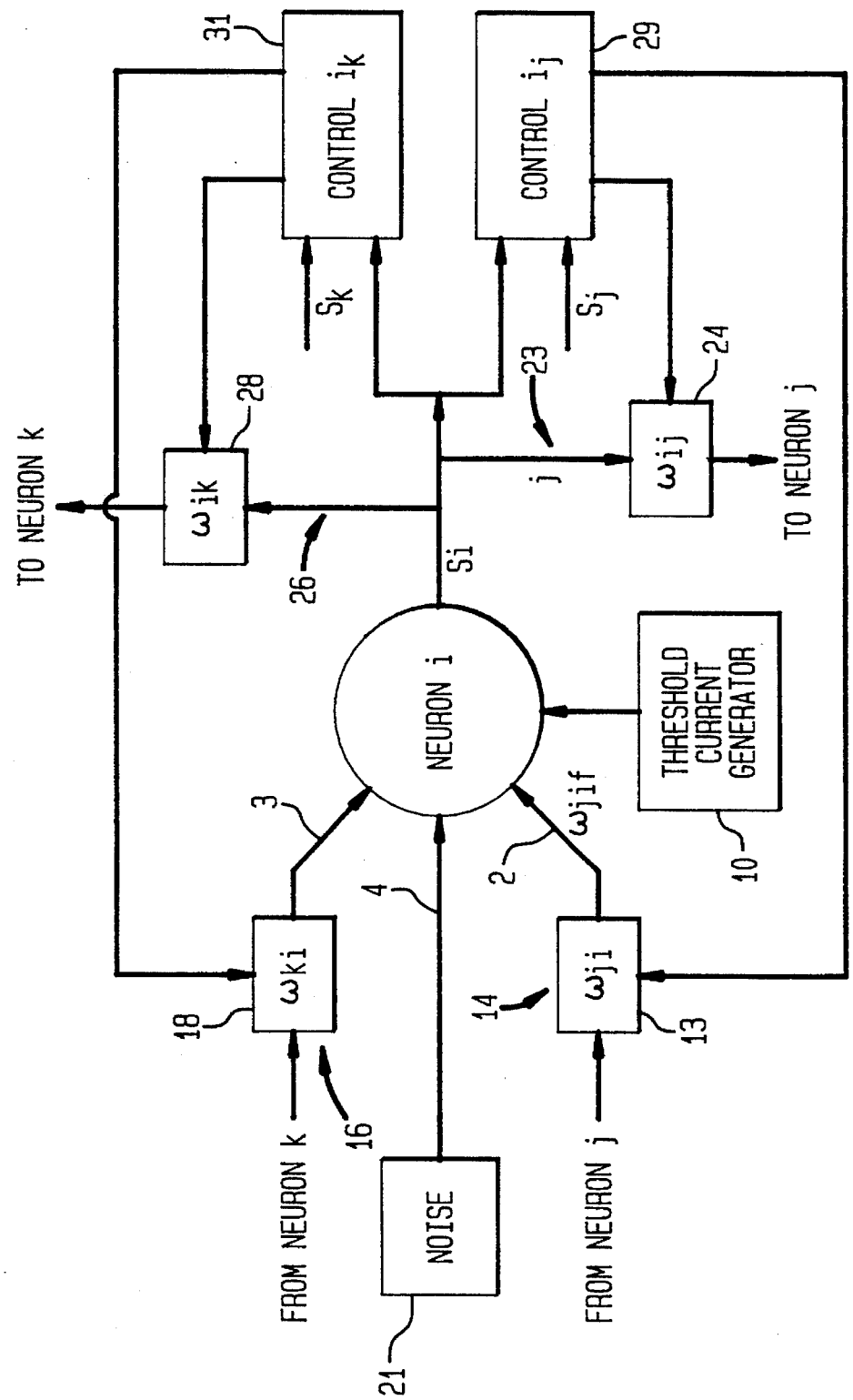
FIG. 3 illustrates the interconnection between neurons in the neural network of FIG. 2.

The interconnection of a neuron i in the channel equalizer 20 of FIG. 2 to other neurons is illustrated in greater detail in FIG. 3.

Figure 1:
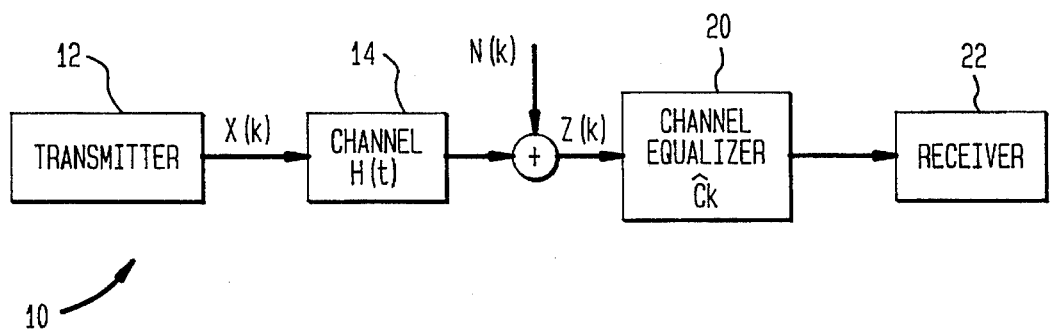
FIG. 1 illustrates a prior art communications system including a channel which introduces distortion into transmitted symbols.

The neuron i has four inputs labeled 1, 2, 3 and 4. The input 1 is for a threshold current produced by the threshold current generator 11. (Typically, the threshold current generator is simply an unused neuron in the neural network.) The input 2 is a current $w_{ji}s_j$, where $w_{ji}$ is the weight of the synaptic connection 14 between the output of neuron j (not shown) and an input of the neuron i and $s_j$ is the output state of the neuron j. The weight $w_{ji}$ is formed by a weighting circuit 13 located in the synaptic connection 14. The input 3 is a current $w_{ki}s_k$ where $w_{ki}$ is the weight of a synaptic connection 16 between the output of a neuron k (not shown) and an input of the neuron i and $s_k$ is the output state of the neuron k. The weight $w_{ki}$ is formed by a weighting circuit 18 located in the synaptic connection 16. In general, the neuron i receives a plurality of weighted input currents from other neurons but only two such inputs, i.e., 2 and 3, are shown in FIG. 1 for purposes of illustration.

The input 4 is a noise input. A noise current is generated by the noise generator circuit 21 and inputted to the neuron i via input 4. The noise input 4 is used for simulated annealing and is discussed in greater detail below.

The neuron i has a voltage output $s_i$. The output $s_i$ can take on a range of values between two values "off" or "on" or "0" or "1" (See FIG. 6 for the values that $s_i$ can take). In general, if the sum of the currents including the threshold current is less than zero, the neuron output $s_i$ is closer to the off state. If the sum of the currents including the threshold current exceeds zero, the neuron output $s_i$ is closer to the on state.

As the network is symmetric, the output $s_i$ of neuron i is connected via the synaptic connection 23 to the neuron j. The synaptic connection 22 contains the weighting circuit 24 whose weight $w_{ij}$ is equal to $w_{ji}$. The output $s_i$ of the neuron 24 is also transmitted via synapse 26 to the neuron k. The synaptic connection 26 includes the weighting circuit 28 whose weight $w_{ik}$ equals $w_{ki}$. The weights $w_{ji}$, $w_{ij}$ are controlled by the control circuit 29. The control circuit 29 receives the output signals of the neurons, i and j, i.e., $s_i$ and $s_j$, and, in response, outputs a signal to control the weights $w_{ij}$ and $w_{ji}$. The weights $w_{ki}$ and $w_{ik}$ are controlled by the control circuit 31. The control circuit 31 receives the outputs $s_i$ and $s_k$ of the neurons i and k and outputs signals to control the weights $w_{ik}$ and $w_{ki}$. In general, there is a control circuit to control the weight of each symmetric synapse in the network.

The control of the synaptic weights takes place as follows. Typically, a Boltzmann Machine type neural network has an input layer of neurons, an output layer of neurons and one or more hidden layers of neurons in between the input and output layers.

The Boltzmann learning algorithm works in two phases. In phase "plus" the neurons in the input and output layers are clamped to a particular pattern that is desired to be learned while the network relaxes through the use of simulated annealing or another technique. In phase "minus", the output neurons are unclamped and the system relaxes while keeping the input neurons clamped. The goal of the learning process is to find a set of synaptic weights such that the learned outputs of the "minus" phase match the desired outputs in the "plus" phase as nearly as possible. The probability that two neurons i and j are both "on" in the plus phase, $P_{ij}^+$, can be determined by counting the number of times both neurons are activated averaged across some or all patterns (input-output mappings) in a training set. For each mapping, co-occurrence statistics are also collected for the minus phase to determine $P_{ij}^-$. Both sets of statistics are collected by the control circuit of the particular symmetric synapse after annealing. In the preferred implementation, the co-occurrence statistics are collected for one pattern as it is being presented.

More generally, after sufficient statistics are obtained by the control circuit, the weights are updated according to the relation $\Delta w_{ij} = \eta (P_{ij}^+ - P_{ij}^-)$ where $\eta$ scales the size of each weight change.

The simulated annealing technique involves perturbing the threshold signals of all neurons in a random fashion while clamping signals are applied to all of the neurons in one or both of the input and output layers of the network. As shown in FIG. 3, the perturbing random signal may be obtained from an electrical noise generator 21 connected to the neuron. By introducing noise there is introduced into the neural network a quantity analogous to thermal energy in a physical system. This "heat" is applied to the network to cause the network to visit all possible states. Then as the temperature (i.e., noise level) is reduced to some minimum, there is a high probability that the network will settle to its lowest energy state, i.e. a global minimum.

As an alternative to simulated annealing, a deterministic method known as the Mean Field Approximation (MFA) may be used. According to this method, the slope of a hyperbolic tangent like transfer function (see FIG. 6) of an amplifier used to implement the neuron is varied from zero to a maximum.

Figure 4:
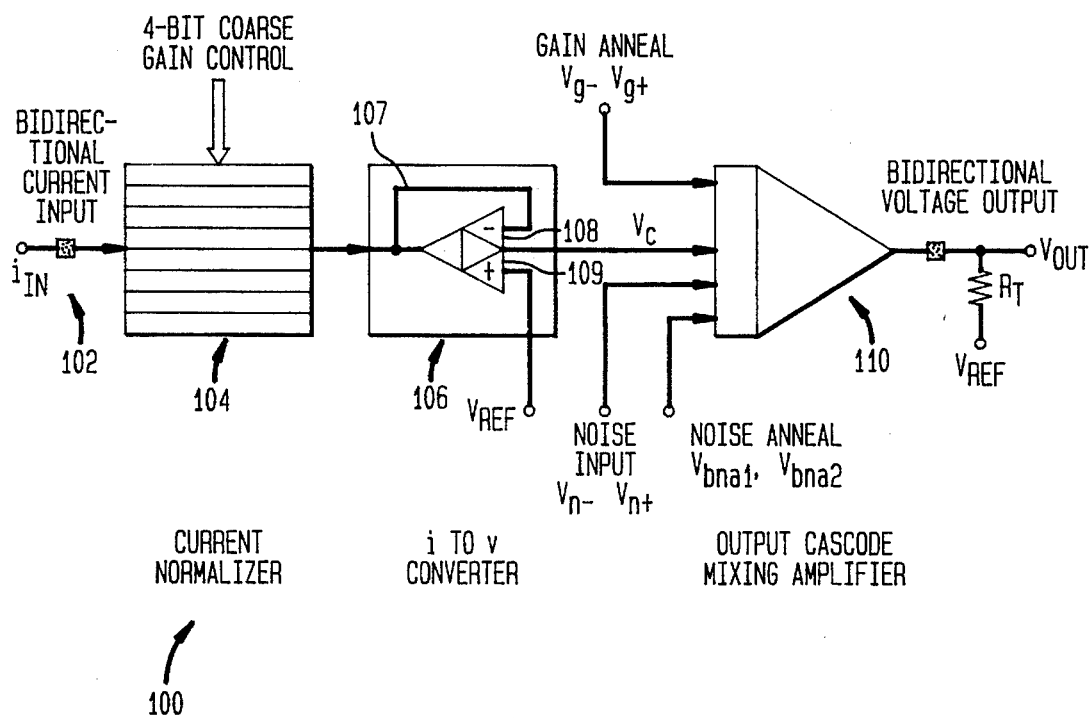
FIG. 4 illustrates a neuron for use in the neural network of FIG. 3.

A neuron 100 in accordance with the present invention is illustrated in FIG. 4. The neuron 100 comprises a bi-directional current input node 102 via which a current $I_{in}$ is inputted into the neuron. The current $I_{in}$ represents the summation of the synaptic input currents to the neuron 100. The current $I_{in}$ is positive for net current flow into the neuron and negative for net current flow out of the neuron. The summation takes place according to Kirchoff's current law at the current input node 102.

The current input node 102 is connected to a current normalizer 104. The summed input current is normalized or scaled in a switch settable manner using the current normalizer 104. The scale value used by the current normalizer is determined by a four bit input, in the present implementation leading to 16 different values or normalization.

The normalized current outputted by the current normalizer 104 is connected to a current to voltage converter 106. The inputs to the current to voltage converter are the normalized current and a reference voltage $V_{ref}$. The current to voltage converter 106 is implemented by a cascode amplifier with the output 107 tied back to the inverting input 108 as in a voltage follower. The reference voltage is inputted at the non-inverting input 109. The class AB output 107 provides a source and sink for the current $I_{in}$. This negative feedback amplifier has a low impedance (100–200 ohms) and has an output voltage $V_c$ which varies about $V_{ref}$.

The output voltage $V_c$ from the converter is connected to an output cascode mixing amplifier 110. The inputs to the output cascode mixing amplifier 110 are $V_c$, $V_{n+}$, $V_{n-}$, $V_{bna1}$, $V_{bna2}$ and $V_{g+}$, $V_{g-}$. The signals $V_{n+}$, $V_{n-}$ are differential (complementary) digital signals generated by a noise generator to input noise into the neuron. The signals $V_{bna1}$, $V_{na2}$, are analog signals that control the envelope of the injected noise signal. These inputs are used for simulated annealing. The neuron can also be settled using the Mean Field Approximation. In this mode, the differential gain control inputs $V_{g+}$, $V_{g-}$ vary the gain of the cascode mixing amplifier 110.

Figure 5:
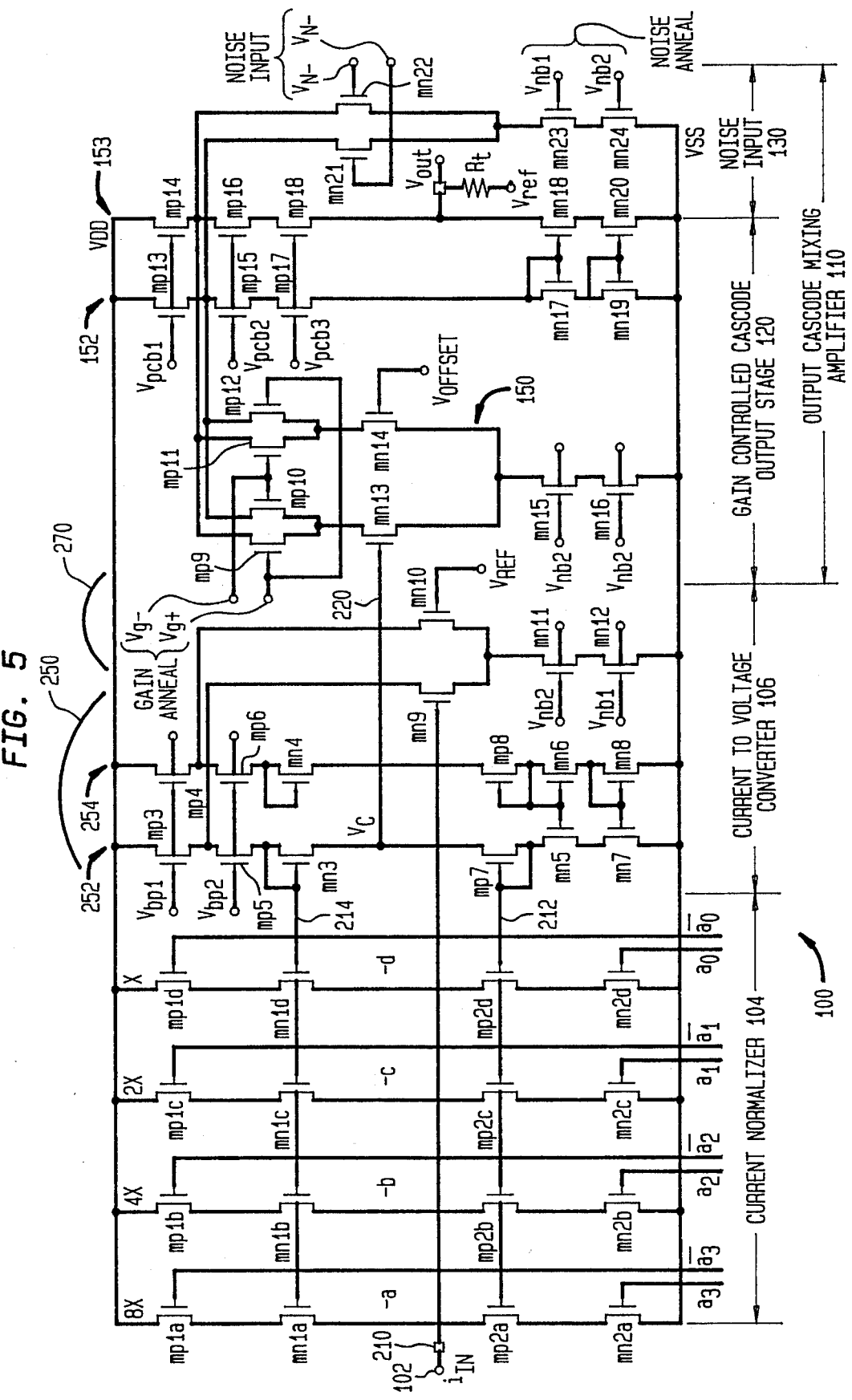
FIG. 5 illustrates the neuron of FIG. 4 in greater detail.

The neuron 100 is illustrated in greater detail in FIG. 5. The current normalizer 104 comprises four current carrying paths a, b, c, d. The paths a, b, c, d extend between a positive supply voltage VDD and a negative supply voltage VSS which may be viewed as the system ground. The path a has the transistors mp1a, mn1a, mp2a, mn2a. The path b has the transistors mp1b, mn1b, mp2b, mn2b. The path c has the transistors mp1c, mn1c, mp2c, mn2c. The path d has the transistors mp1d, mn1d, mp2d, mn2d. As used herein "mp" designates a p-channel device and "mn" designates an n-channel device. The transistors in the paths a, b, c, d, are sized in the ratio 8:4:2:1. The paths a–d are controlled by the switching transistors mp1a–d, mn2a–d. The states of these transistors are determined by the input signals $a_3$, $\bar{a}_3$, $a_2$, $\bar{a}_2$, $a_1$, $\bar{a}_1$, $a_0$, $\bar{a}_0$. These input signals are used to turn on particular ones of the paths a–d with a four bit sensitivity.

The control transistors mp2a–d, mn1a–d allow the currents to flow in the four paths a, b, c, d. The voltages at the gates of these transistors move up or down depending on the summed current $I_{in}$. This control is effected by the current to voltage converter 106 via paths 212 and 214.

In a preferred embodiment, the four paths a, b, c, d of the current normalizer 104 are laid out in a common centroid fashion in silicon to reduce processing variations. The switch transistors mp1a–d, mn2a–d, are MOS devices with long channels. This raises the channel resistance when a transistor is in the on state, thus linearizing the response. This also performs a current limiting function by preventing large currents from flowing in the paths a–d. As the current increases in these paths, the drain-source voltage of the switch transistors mp1a–d, mn2a–d increases, pinching the drain-source voltage of the control transistors mp2a–d, mn1a–d thus limiting the current.

As shown in FIG. 5, the current to voltage converter 106 comprises a cascode stage 250 with two cascode legs. The first leg 252 comprises the transistors mp3, mp5, mn3, mp7, mn5, mn7. The second leg 254 comprises the transistor mp4, mp6, mn4, mp8, mn6, mn8. The voltages $V_{pb1}$ and $V_{pb2}$ are bias voltages.

An amplifier stage 270 comprises the transistors mn9, mn10, mn11, mn12. The gate of mn10 is at $V_{ref}$ which is typically 2.5 volts. The transistors mn9, mn10 form a differential pair. In the absence of a net input current $I_{in}$, the gate of the transistor mn9 is also at $V_{ref}$ and so is the path 210 leading to the input node 102. Thus, the input node 102 provides a low impedance point for current summation. In addition, the currents in the two cascode legs 252, 254 are equal. The voltages $V_{nb2}$ and $V_{nb1}$ are bias voltages.

The currents in the legs a, b, c, d, of the current normalizer 104 mirror the current of the cascode leg 252. If all the paths a, b, c, d in the current normalizer 104 are on, the current in the legs a, b, c, d can be sixteen times the current in the cascode leg 252. If only the smallest ratio path d is on, the current mirror ratio is 1:1. When $I_{in}$ is positive at the node 102, current flows into the neuron via transistors mp2a–d and mn2a–d. The gate voltage of mp7 moves lower to let the transistors mp2a–d carry this current. When the net input current $I_{in}$ is negative, the transistors mp1a–d, mn1a–d, source current and the gate voltage of mn3 move higher to let transistors mn1a–d carry this current. The voltage $V_c$ which is the output voltage of the current to voltage converter 106 also moves up or down depending on the direction of the input current in the path 210. Specifically, a non-zero input current $I_{in}$ unbalances the differential pair mn9, mn10 in the amplifier stage 270. This in turn changes the current in the two cascode legs 252, 254 so that the current in the two legs is not equal. Thus, in this manner, the bi-directional current at the input in path 210 is converted to the output voltage $V_c$ in path 220.

To reduce the power consumption of the current to voltage converter 106, the following technique is utilized. The silicon process is an n-well process so the substrates of the p-channel control transistors mp2a–d in the current normalizer 104 are connected to VDD. But the substrate of the current mirror transistor mp7 in the converter 106 is connected to its source. This eliminates the body effect on mp7, thus reducing its source-to-drain voltage by about 20 mV, which is just enough to turn off the mp2a–d current during zero input current. Thus, very low power consumption is achieved in the converter 106 in spite of class AB operation.

The output $V_c$ of the current-to-voltage converter is transmitted to the output cascode mixing amplifier 110. The output cascode mixing amplifier is also shown in greater detail in FIG. 5. The output cascode mixing amplifier 110 comprises a gain controlled cascode output stage 120 and a noise input stage 130. The voltage $V_c$ on path 220 from the previous stage represents the magnitude and direction of the synaptic summation currents. This voltage is fed to a differential stage 150 formed by the transistors mn13–mn16. Specifically, the voltage $V_c$ is connected to the gate of the transistor mn13. A voltage $V_{offset}$ is applied to the gate of mn14. The voltage $V_{offset}$ is nominally at about 2.37 V to cancel the offset of the neuron output.

The transistor pairs mp9, mp10 and mp11, mp12 are current splitters that control the amount of current entering the cascode legs 152 and 153. The cascode leg 152 comprises the transistors mp13, mp15, mp17, mn17, mn19. The cascode leg 153 comprises the transistors mp14, mp16, mp18, mn18, mn20. At zero differential input in the gain anneal signals $V_{g-}$, $V_+$ and the signal inputs $V_c$, $V_{offset}$, the current flowing through each of the cascode legs 152, 153 is the same. Hence, there is no current flowing in the output resistor $R_T$, causing the output voltage $V_{out}$ of the neuron 100 to be at 2.5 volts. Due to offsets, $V_{out}$ will not be at exactly 2.5 volts but this can be corrected using $V_{offset}$. As this balance is changed by introducing a differential voltage between the gates of the transistors mp13–mp14, the top of leg 152 (mp13, mp15, mp17) has a different current from the top of leg 153 (mp14, mp16, mp18). However, the bottom of leg 152 (mn17, mn19) has the same current as the bottom of leg 153 (mn18, mn20) due to current mirror action. The difference is made up for from the current flowing through $R_T$ which produces a voltage at $V_{out}$.

Figure 6:
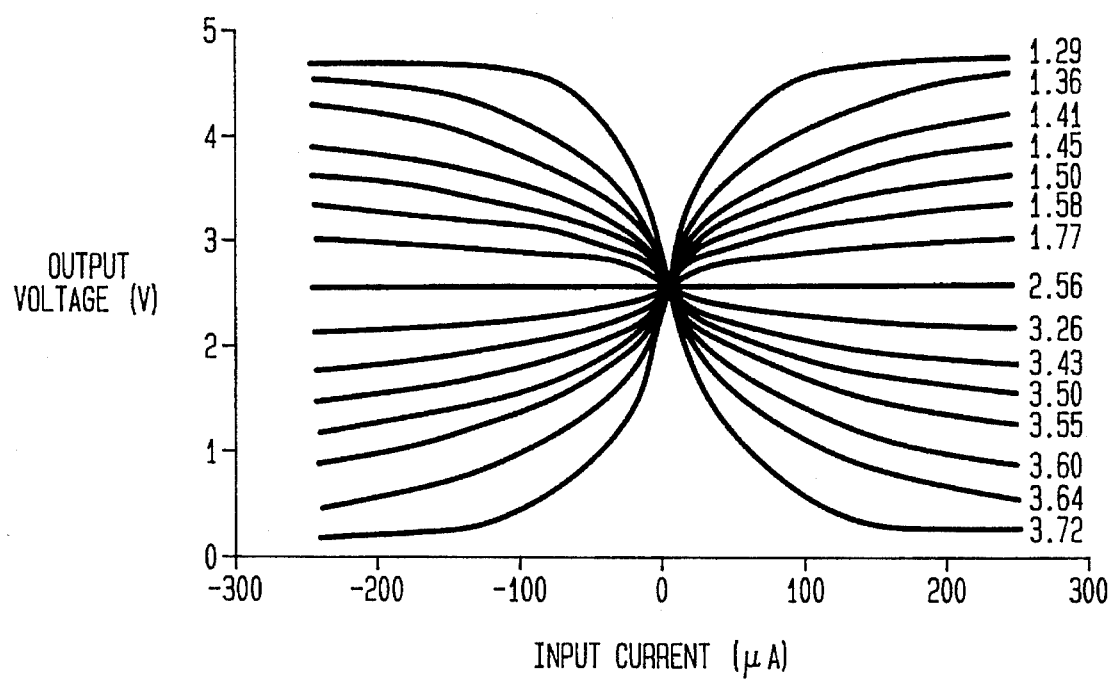
FIG. 6 plots a neuron transfer function for various gain values.

This distribution of current can also be varied by the differential gain anneal signals $V_{g-}$, $V_{g+}$ which act on top of the signal inputs $V_c$, $V_{offset}$, to achieve a smooth gain variation at the output $V_{out}$ from a positive maximum to a negative maximum. The gain characteristics of the gain controlled cascode output stage 120 are illustrated in FIG. 6 for different values of $V_{g-}$, $V_{g+}$.

The termination of the neuron 100 of FIG. 5 using the resistor $R_T$ provides the following advantages. First, at zero input, the output voltage $V_{out}$ can be set to 2.5 volts by the $V_{offset}$ control assuming the power supply is +5 V and the ground reference is zero volts. Because the input to the neuron is fixed at 2.5 volts by the current-to-voltage converter 106, this arrangement provides a stable zero reference for the entire neural network. Second, the output resistor $R_T$ in conjunction with the load capacitance of the $V_{out}$ node determines the frequency response of the entire neuron. This enables a single pole roll-off characteristic for the output stage 120 of the neuron 100, thereby ensuring stability. The output resistor $R_T$ determines the settling time of the neuron, thereby enabling control over the network dynamics. Moreover, as $R_T$ is external to the chip containing the neuron, the value of $R_T$ can be varied and, therefore, matched to the input dynamic linear range of the synapses.

The noise input stage 130 of FIG. 5 provides a convenient way of adding noise which is required by the Boltzmann Algorithm. A high speed pseudo-random digital pulse is applied to the inputs $V_{n-}$, $V_{n+}$ of the noise differential pair mn21, mn22. This signal modulates the current in the cascode stage 120 and the output resistor converts this to part of the output voltage $V_{out}$. The bandwidth of the neuron limits the high frequency components of the noise and forms an analog noise signal that can be used to settle the network by annealing. The annealing is done by reducing the current in the tail (mn23, mn24) of the differential pair (mn21, mn22). This reduction in the tail current is accomplished by using the noise anneal voltage $V_{bna1}$, $V_{bna2}$. The generation of $V_{bna1}$, $V_{bna2}$ is discussed below.

Figure 7:
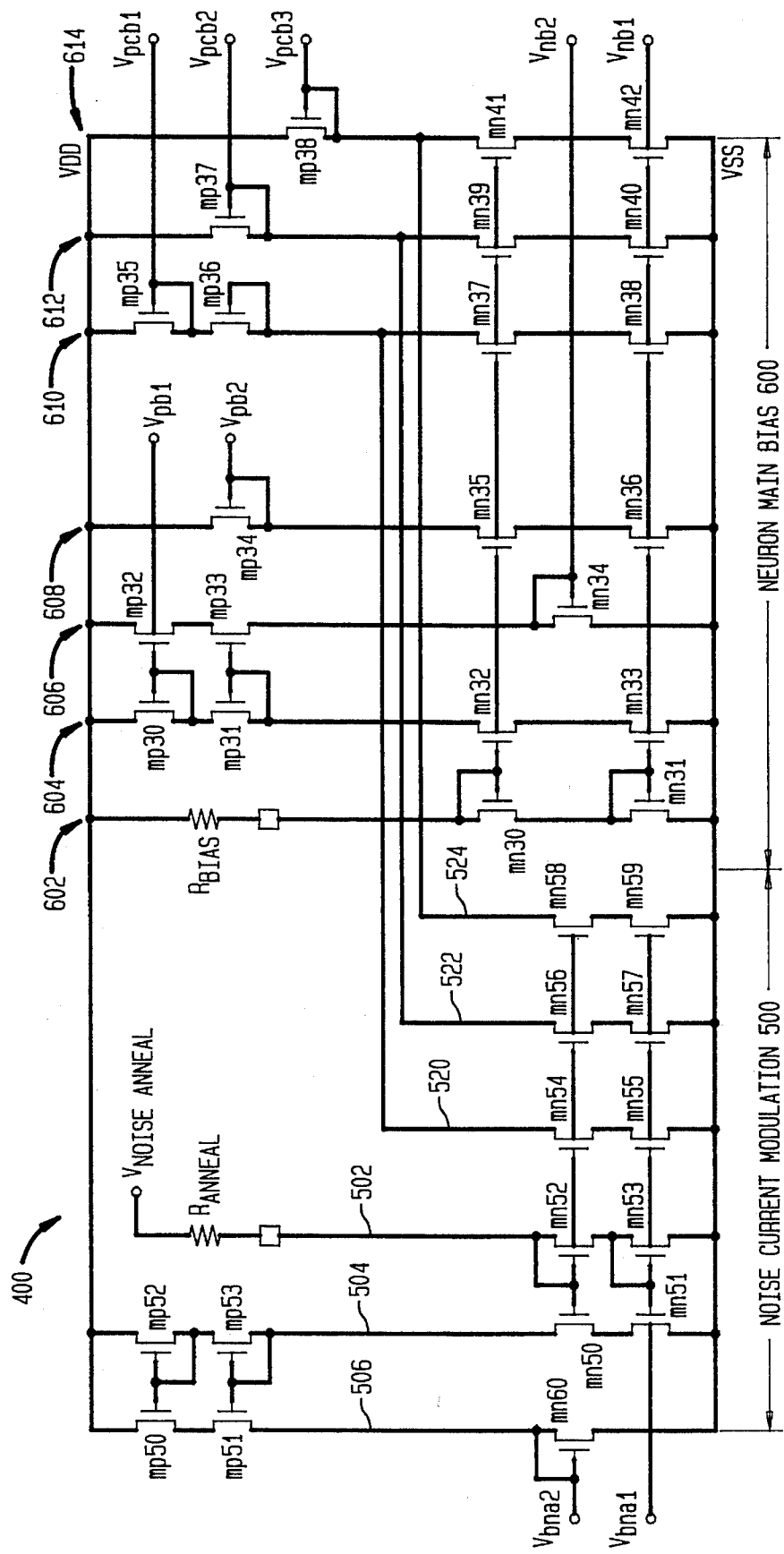
FIG. 7 depicts a bias circuit for use with the neuron of FIG. 5.

As indicated above, the current to voltage converter utilizes the bias voltages $V_{pb1}$, $V_{pb2}$, $V_{nb1}$, $V_{nb2}$. The output cascode mixing amplifier 110 utilizes the bias voltages $V_{pcb1}$, $V_{pcb2}$, $V_{pcb3}$. These bias voltages are generated in the neuron bias circuit 400 illustrated in FIG. 7. The neuron bias circuit 400 also generates the noise anneal signals $V_{bna1}$, $V_{bna2}$.

The neuron bias circuit 400 comprises a noise current modulation stage 500 and a neuron main bias stage 600.

The neuron main bias stage comprises seven legs 602, 604, 606, 608, 610, 612, 614. The legs extend between VDD and VSS. The leg 602 comprises the transistors mn30 and mn31 and the resistor $R_{bias}$. The leg 604 comprises the transistors mp30, mp31, mn32, mn33. The leg 606 comprises the transistors mp32, mp33, mn34. The leg 608 comprises the transistors mp34, mn35, mn36. The leg 610 comprises the transistors mp35, mp36, mn37, mn38. The leg 612 comprises the transistors mp37, mn39, mn40. The leg 614 comprises transistors mp38, mn41, mn42. A reference current is generated in $R_{bias}$ in leg 602. This current is mirrored in legs 610, 612, 614 by transistors mn37 and mn38, mn39 and mn40, and mn41 and mn42. The W/L (width/length) ratio of the p-transistor in the legs 610, 612, 614 is 16:8:1. This ensures that the bias voltages $V_{pcb1}$, which is obtained at the gate of mp35 in leg 610, $V_{pcb2}$ which is obtained at the gate of mp37 in leg 612, and $V_{pcb3}$, which is obtained at the gate of mp38 in leg 14, are such that the p-channel transistors mp13–mp18 (see FIG. 5) are maintained in saturation during normal operation and maintains the voltage swing of the neuron cascode output stage 120 to within 300–400 mV of VDD.

The bias voltage $V_{nb1}$ is obtained at transistor mn31 in leg 604 and the bias voltage $V_{nb2}$ is obtained at transistor mn34 in leg 606. The bias voltage $V_{pb1}$ is obtained at transistor mp30 in leg 604 and the bias voltage $V_{pb2}$ is obtained at transistor mp34 in leg 608.

The operation of the noise current modulator stage is now considered. The noise current modulator stage 500 comprises the legs 502, 504, 506, 520, 522, 524.

The leg 502 comprises the resistor $R_{anneal}$ and the transistors mn52 and mn53. The leg 504 comprises the transistors mp52, mp53, mn50, mn51. The leg 506 comprises the transistors mp50, mp51 and mn60. The leg 520 comprises the transistors mn54 and mn55. The leg 522 comprises the transistors mn56 and mn57. The leg 524 comprises the transistors mn58 and mn59.

A voltage $V_{noise\ anneal}$ is applied to the resistor $R_{anneal}$ to generate a noise modulation current. This current is mirrored in the legs 520, 522 and 524. This current is also mirrored in the legs 504 and 506 wherein the voltage $V_{bna1}$ is obtained at transistor mn53 and $V_{bna2}$ is obtained at transistor mn60. As indicated above, the voltages $V_{bna1}$, $V_{bna2}$ are used to generate a slowly decaying noise envelope for use in the simulated annealing process.

The addition of noise increases the current in the output stage 120 and the bias voltage $V_{pcb1}$, $V_{pcb2}$, $V_{pcb3}$ may not be correct in this case. So during noise anneal, the bias currents are modulated to maintain the transistors mp13–mp18 in saturation. This is done by pulling currents equal to the noise modulation current from the bias leg 610, the bias leg 612 and the bias leg 614 by the current in paths 520, 522, and 524, respectively.

In short, an adaptive equalizer using a Boltzmann Machine type neural network has been disclosed. Finally, the above described embodiments of the invention are intended to be illustrative only. Numerous alternative embodiments may be devised by those skilled in the art without departing from the spirit and scope of the following claims.

We claim:

1. A communications system comprising a transmitter for generating signals, a channel for transmitting said signals and for introducing distortions into said signals, an equalizer for receiving distorted signals from the channel and for equalizing the distortions, and a receiver for receiving equalized signals from the equalizer, said equalizer comprising a self-learning neural network having an input layer of neurons for receiving said distorted signals from the channel and an output layer of neurons for outputting said equalized signals, each of said neurons comprising a node for obtaining a net input current, a current normalizer for normalizing the net input current, a current-to-voltage converter, and a gain controlled cascode output amplifier.

2. The system of claim 1 wherein said neural network is a Boltzmann Machine type neural network and said neural network comprises a hidden layer of neurons connected between said input layer of neurons and said output layer of neurons.

3. The system of claim 1 wherein said neural network comprises at least a portion of a VLSI chip.

4. The system of claim 1 wherein at least a portion of said channel goes through the atmosphere.

5. The systems of claim 4 wherein said equalizer is located in a portable terminal in a personal communication network.

6. The system of claim 1 wherein said cascode output amplifier includes means for receiving a noise signal for simulated annealing.

7. The system of claim 1 wherein said cascode output amplifier includes means for varying a gain so that said network can be settled using the Mean Field Approximation.

8. An equalizer for equalizing a communications channel comprising means for receiving distorted signals transmitted via said channel, and a neural network for equalizing said distorted signals, said neural network comprising an input layer of neurons, a hidden layer of neurons, and an output layer of neurons, said neurons being connected by symmetric synapses, each of said neurons comprising an input node for obtaining a net input current, a normalizer for normalizing the net input current, a current-to-voltage converter for converting said normalized net input current into a voltage, and an output amplifier stage.

9. The equalizer of claim 8 wherein at least a portion of said channel comprises the atmosphere.

10. The equalizer of claim 8 wherein there is a direct connection between the input layer and the output layer.

11. An equalizer for equalizing a communications channel comprising means for receiving distorted signals via said channel, and a self-learning neural network for equalizing said distorted signals comprising an array of neurons connected by synapses, each of said neurons comprising an analog integrated VLSI circuit which comprises a current normalizer for normalizing a net input current, a current-to-voltage converter connected to the normalizer, and a cascode amplifier connected to said converter.

12. The equalizer of claim 11 wherein said neural network is a Boltzmann Machine type neural network.

* * * * *